United States Patent
Olsson et al.

[19]

[11] Patent Number: 6,007,039

[45] Date of Patent: Dec. 28, 1999

[54] ZERO LOOSENESS FASTENER FOR A LINKAGE ASSEMBLY

[75] Inventors: Nils O. Olsson, Glen Ellyn, Ill.; Gregory David Collins, Gravenhurst, Canada

[73] Assignee: Meritor Automotive Canada, Inc., Bracebridge, Canada

[21] Appl. No.: 09/151,569

[22] Filed: Sep. 11, 1998

[51] Int. Cl.6 .................................................. F16M 13/00
[52] U.S. Cl. ...................................... 248/424; 296/65.18
[58] Field of Search ..................................... 248/424, 421, 248/429, 423; 297/344.15; 296/65.01, 65.05, 65.18

[56] References Cited

U.S. PATENT DOCUMENTS

| | | | |
|---|---|---|---|
| 5,125,631 | 6/1992 | Brodensen et al. | 248/421 X |
| 5,863,098 | 1/1999 | Kojima et al. | 248/421 X |
| 5,882,061 | 3/1999 | Guillouet | 296/65.05 |
| 5,938,164 | 8/1999 | Kargol et al. | 248/429 |

*Primary Examiner*—Ramon O. Ramirez
*Attorney, Agent, or Firm*—Howard & Howard

[57] ABSTRACT

The present invention relates generally to a fastener used for connecting a first link member to a second link member in a linkage assembly. The second link member includes a pair of aligned apertures and a slot located transversely between the apertures. The first link member includes an aperture at a first end that is designed to be received in the slot located in the second link member. The fastener has a centering post at a distal end and a head portion at a proximal end with a self-tapping portion located between the head portion and the centering post. The aperture in the first link member is aligned with the apertures in the second link member and the fastener is inserted through the apertures until the self-tapping portion contacts the first link member. Thereafter, rotation of the fastener in a first direction taps the self-tapping portion of the fastener through the aperture in the first link member. The fastener is rotated until the first link member is flush against the head portion of the fastener. Thus, the fastener rotatably secures the first link member to the second link member and prevents lateral free play movement between the fastener and the second link member, and between the first link member and the second link member.

20 Claims, 2 Drawing Sheets

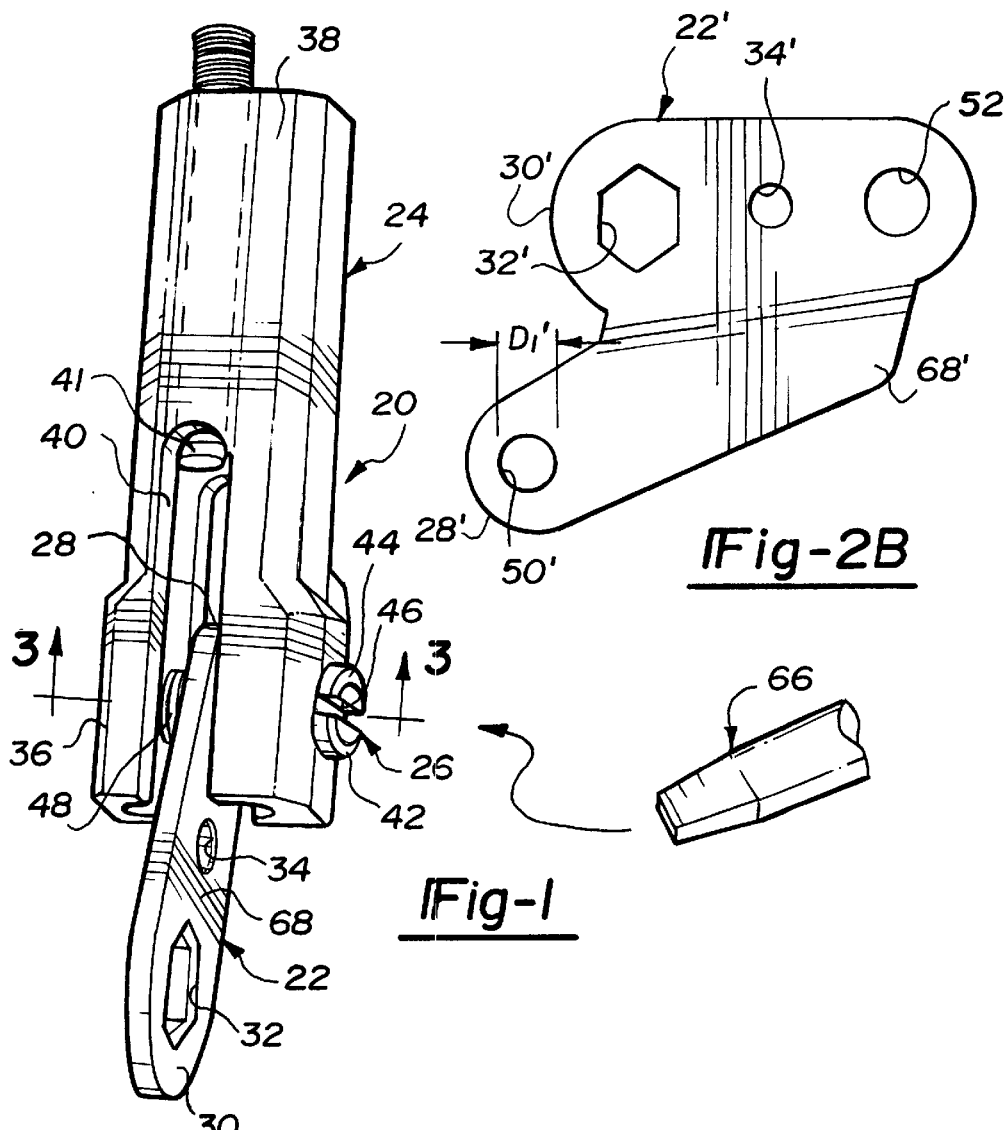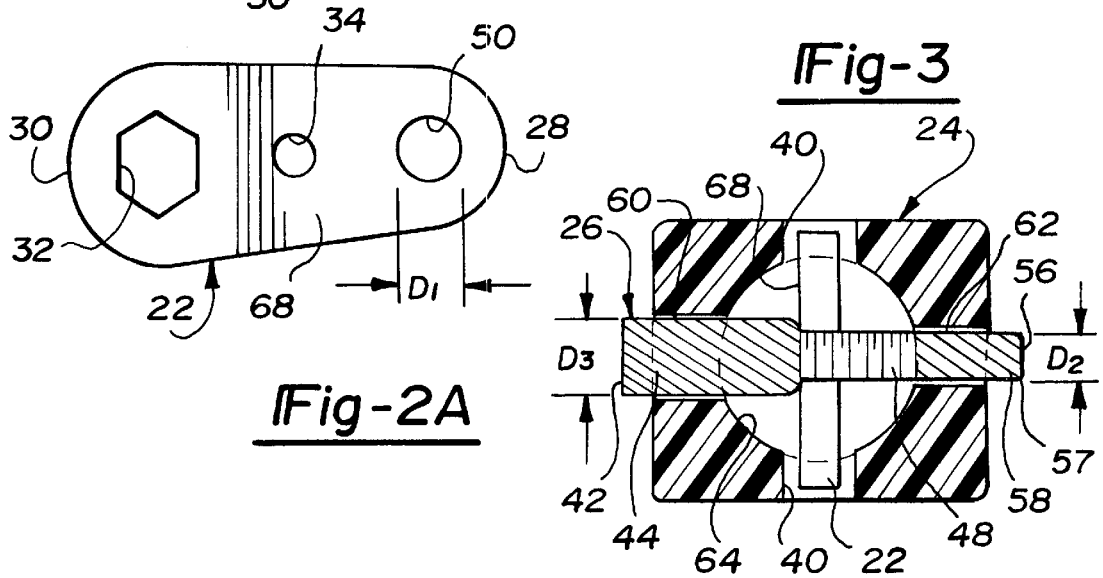

ZERO LOOSENESS FASTENER FOR A LINKAGE ASSEMBLY

BACKGROUND OF THE INVENTION

This invention relates generally to a fastener used for connecting a first link member to a second link member in a linkage assembly for a vehicle seat track assembly and, more particularly, to a fastener having a head portion, a centering post, and a self tapping portion that is used to rotatably secure the first link member to the second link member while eliminating any lateral free play in the linkage assembly.

Linkage assemblies are often used in vehicle seat track assemblies to provide various functions including seat adjustment capability. Linkage assemblies typically include two or more link members, which are joined to each other by various methods. The link members typically receive input from an adjuster control member that causes the link members to rotate relative to one another to achieve a desired position. In known linkage assemblies, as the link members rotate relative to each other there has typically been lateral free play or movement between the link members. This lateral free play is detrimental to the stability of the adjuster control member and the linkage assembly.

Attempts to eliminate the lateral free play between the link members of a linkage assembly have been made. In the past, one method has been to incorporate a bushing to permit the link members to rotate relative to each other and a pin that is press fit into the bushing to secure the link members to each other. One disadvantage with this method is that assembly of the parts into the linkage assembly can be especially difficult because it requires clamping pressure, which damages the bushing if there is any misalignment of the pin relative to the bushing. In addition, this method requires at least two parts, namely, a bushing and a press fit pin. One other disadvantage with this method is that the initial step of aligning the bushing and press fit pin with apertures in the link members can be very difficult.

Thus, it is desirable to eliminate the use of bushings and press fit pins to join the link members of a linkage assembly. It is also desirable to provide a fastener for connecting the link members of the linkage assembly that has a reduced number of parts as compared to the current methods. Additionally, it is desirable to provide a fastener for a linkage assembly that is self-centering and thus, reduces assembly time and mis-alignment problems.

SUMMARY OF THE INVENTION

In general terms, this invention provides a fastener and a method for using the fastener to secure a first link member to a second link member to create a linkage assembly, wherein the fastener permits the first link member to rotate relative to the second link member while eliminating free play movement in the linkage assembly.

In one embodiment of the present invention the linkage assembly comprises a first link member, a second link member, and a fastener. The first link member has a first aperture at a first end. The second link member has a second aperture, a third aperture and a slot. The second aperture is aligned with the third aperture and the slot is located transversely between the second and third apertures. The fastener includes a head portion at a proximal end, a centering post at a distal end, and a self-tapping portion located between the head portion and the centering post. The first end of the first link member is received in the slot and the first aperture is aligned with the second and third apertures. The fastener extends through the first aperture, the second aperture and the third aperture. The self-tapping portion taps the first aperture and thereby rotatably secures the first link member to the second link member.

A method of using the fastener comprises the steps of providing a fastener having a centering post at a distal end, a head portion at a proximal end, and a self-tapping portion located between the head portion and the centering post; providing a first link member having a first aperture at a first end; and providing a second link member having a slot adapted to receive a portion of the first link member and having a second aperture aligned with a third aperture, with the second and third apertures located transverse to the slot. The first end of the first link member is placed in the slot and the first aperture is aligned with the second and third apertures. The centering post is inserted through the second aperture, first aperture and into the third aperture. The fastener is then rotated and the self-tapping portion taps through the first aperture, thereby securing the first link member rotatably to the second link member.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a top perspective view of a fastener designed according to the present invention incorporated into a linkage assembly;

FIG. 2A is a top plan view of one embodiment of a first link member designed according to the present invention;

FIG. 2B is a top plan view of a second embodiment of a first link member designed according to the present invention;

FIG. 3 is a cross-sectional view along line 3—3 of FIG. 1; and

DETAILED DESCRIPTION OF THE PREFERRED EMBODIMENT

Figure 4:
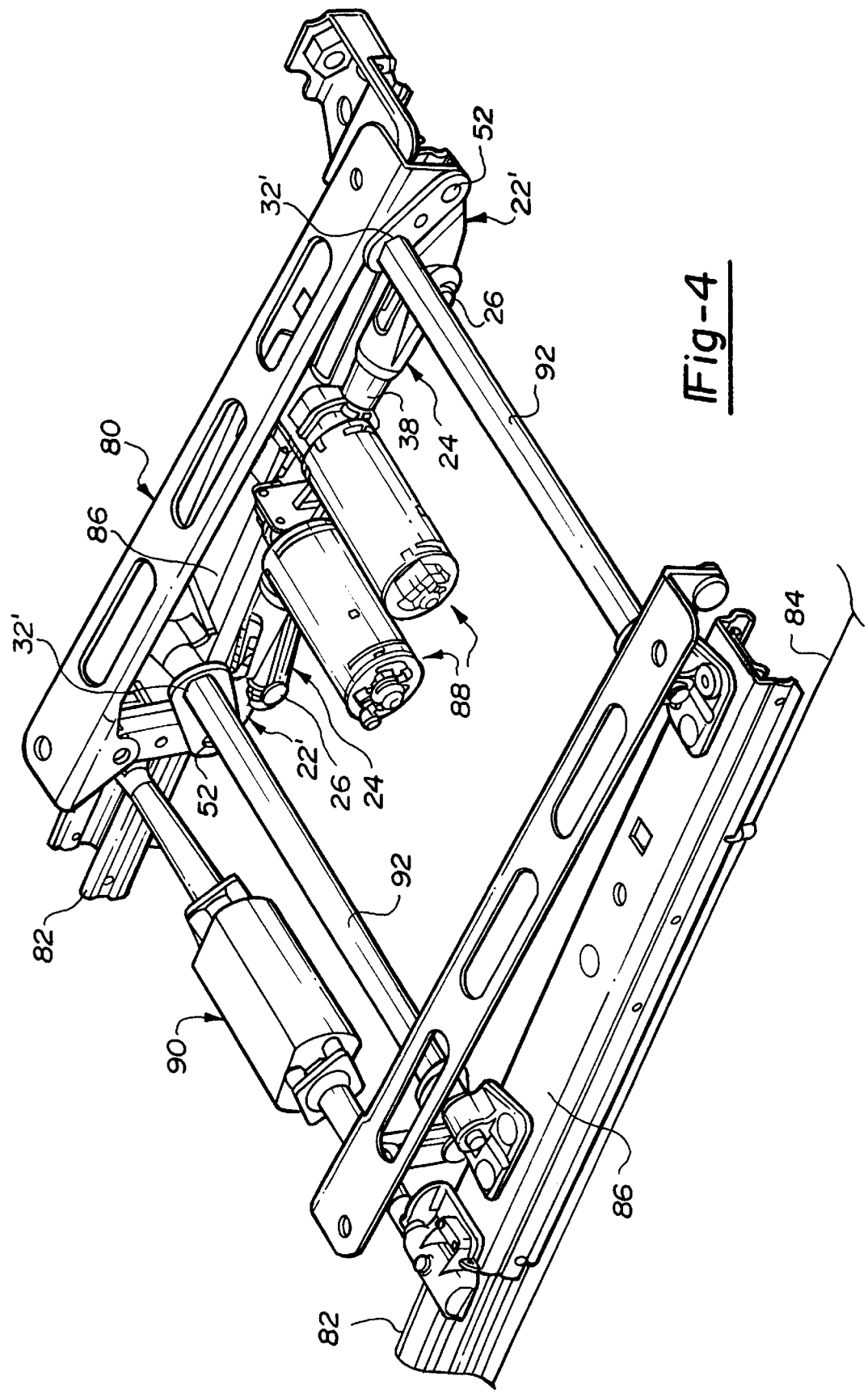
FIG. 4 is a perspective view of a vehicle seat track assembly incorporating the linkage assembly and the fastener designed according to the present invention.

A linkage assembly is generally indicated at 20 in FIG. 1. Linkage assembly 20 includes a first link member 22, a second link member 24, and a fastener 26. First link member 22 includes a first end 28 and a second end 30. A fourth aperture 32 is located adjacent second end 30 of first link member 22. A fifth aperture 34 is located on first link member 22 between second end 30 and first end 28. Second link member 24 includes a flared proximal portion 36 opposite a distal portion 38. Flared proximal portion 36 provides structural strength to second link member 24. A slot 40 extends from flared proximal portion 36 into distal portion 38. A bolt 41 extends from one end of slot 40 out through distal portion 38. Bolt 41 is used to secure second link member 24 to a vehicle seat track assembly 80 (see FIG. 4). As will be understood by one of ordinary skill in the art, bolt 41 could comprise any of the other fasteners as are known in the art.

Fastener 26 includes a proximal end 42 and a head portion 44 located at proximal end 42. Head portion 44 further includes a slot 46. Fastener 26 includes a self-tapping portion 48 located adjacent head portion 44. A tool 66, adapted to engage slot 46 of head portion 44, is also shown.

When tool 66 is engaged in slot 46, rotation of tool 66 rotates fastener 26. Rotation of fastener 26, as explained below, drives self-tapping portion 48 through first link member 22 and rotatably secures first link member 22 to second link member 24. Although tool 66 is shaped to engage slot 46 it will be obvious to one having the ordinary skill in the art that head portion 44 could incorporate other designs to engage other tools. For example, head portion 44 could include a recessed hole shaped to engage, for example, a hexagonal-shaped wrench. Likewise, head portion 44 could include a bolt head for engagement by a wrench as is known in the art.

In a preferred embodiment, second link member 24 is formed from a plastic material while fastener 26 and first link member 22 are formed from a metal. In such an embodiment, second link member 24 serves as a bearing surface for fastener 26. Self-tapping portion 48 permits first link member 22 to rotate relative to second link member 24. As first link member 22 rotates it moves laterally along the longitudinal axis of fastener 26. Thus, the width of slot 40 must be wide enough to accommodate the lateral motion necessary to permit free rotation of first link member 22 about fastener 26. When first link member 22 is rotated relative to second link member 24 there is also some rotation of fastener 26 within second link member 24. Fifth aperture 34 in first link member 22 serves as a tooling aperture and forms no part of the present invention.

FIG. 2A is a top plan view of one embodiment of first link member 22. A first aperture 50 is located adjacent first end 28 of first link member 22. First aperture 50 has a diameter equal to D1. Preferably, D1 is smaller than the diameter of self-tapping portion 48 so that driving self-tapping portion 48 through first aperture 50 secures first link member 22 to fastener 26. First link member 22 has a width that permits it to be received in slot 40 of second link member 24 and includes a first side 68. Fourth aperture 32 is shown as having a non-circular contour. As described more fully below, the contour of fourth aperture 32 is designed to engage a cross tube 92 of a vehicle seat track assembly 80 (see FIG. 4). The contour of fourth aperture 32 can be other than shown, for example, fourth aperture 32 can have any non-circular shape that would permit it to mate with and engage cross tube 92 such that rotation of first link member 22 will cause a corresponding rotation in the cross tube 92.

FIG. 2B is an alternative embodiment of first link member 22 and similar structural features are given the same numeral designation plus a prime sign. Thus, second link member 22' includes a first end 28' having a first aperture 50' with a diameter of D1'. Diameter D1' is preferably smaller than the diameter of self-tapping portion 48 so that driving self-tapping portion 48 through first aperture 50' secures first link member 22' to fastener 26. First link member 22' further includes a second end 30' and a fourth aperture 32' located adjacent second end 30'. A fifth aperture 34' is used as a tooling hole. First link member 22' further includes a first side 68'. First link member 22' also includes a sixth aperture 52. Sixth aperture 52 secures first link member 22' to a vehicle seat track assembly 80 as shown in FIG. 4.

FIG. 3 is a cross-sectional view along line 3—3 of FIG. 1. Fastener 26 includes a distal end 56 and a centering post 58 located at distal end 56. Second link member 24 includes a second aperture 60 and a third aperture 62. Second aperture 60 is aligned with third aperture 62 and second aperture 60 and third aperture 62 are transverse to slot 40. Third aperture 62 has a diameter D2 and second aperture 60 has a diameter D3. Second link member 24 includes a cylindrical opening 64 in flared proximal portion 36. Cylindrical opening 64 permits access to bolt 41 to secure second link member 24 to vehicle seat track assembly 80 (see FIG. 4). Preferably, head portion 44 has a diameter that is equal to D3 and centering post 58 has a diameter that is equal to D2. Thus, fastener 26 fits snugly in second link member 24 with no loose play between fastener 26 and second link member 24. Distal end 56 includes a tapered portion 57, which aides the insertion of centering post 58 into third aperture 62.

The assembly of linkage assembly 20, as shown in FIG. 3, comprises the following steps. Initially, first link member 22 is placed in slot 40 of second link member 24 with first aperture 50 generally aligned with second aperture 60. Second, distal end 56 of fastener 26 is inserted through second aperture 60, first aperture 50, and into third aperture 62. The diameters of second aperture 60 and head portion 44 aid in aligning centering post 58 with third aperture 62. At this stage self-tapping portion 48 is in contact with first side 68 of first link member 22 and centering post 58 is partially in third aperture 62. Third, tool 66 is engaged with slot 46 of fastener 26. Fourth, tool 66 is rotated in a first direction, depending on the handedness of the threads of self-tapping portion 48, and self-tapping portion 48 begins to tap first aperture 50. As will be understood by one having ordinary skill in the art, the diameter of self-tapping portion 48 is somewhat larger than D1. Tool 66 is rotated until first side 68 of first link member 22 is closely adjacent to head portion 44 of fastener 26. Preferably, tool 66 is rotated until a pre-determined torque is achieved as is known in the art. At this stage both head portion 44 and centering post 58 extend beyond second link member 24. Because the diameter of head portion 44 is nearly identical to D3 and the diameter of centering post 58 is nearly identical to D2, there is no looseness between fastener 26 and second link member 24. The linkage assembly 20 permits first link member 22 to rotate relative to second link member 24. Rotation of first link member 22 will move first link member 22 laterally along the longitudinal axis of fastener 26. The width of slot 40 is designed to accommodate this lateral movement of first link member 22. Assembly of first link member 22' to second link member 24 would be accomplished in the same manner as described above.

In FIG. 4 a vehicle seat track assembly is generally shown at 80. Vehicle seat track assembly 80 includes a lower track 82 that is adapted to be mounted to a vehicle floor 84. Vehicle seat track assembly 80 further includes an upper track 86 that is slidably received on lower track 82. A pair of vertical adjuster assemblies 88 are shown and each is attached to a distal portion 38 of a second link member 24. In FIG. 4 first link member 22' is shown secured to second link member 24 by fastener 26. Vehicle seat track assembly 80 further includes a pair of cross tubes 92. Cross tubes 92 each include a non-circular portion that mates with the contour of fourth aperture 32' of first link member 22'. As shown in FIG. 4 sixth aperture 52 secures first link member 22' to vehicle seat track assembly 80. The mating between the contour of fourth aperture 32' and cross tubes 92 permits torque to be applied to cross tubes 92 by vertical adjuster assemblies 88 and to thereby alter the height and tilt of a vehicle seat (not shown). Vehicle seat track assembly 80 further includes a horizonal adjuster assembly 90.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for securing a first link member to a second link member of a linkage assembly for a vehicle seat track assembly comprising the steps of:
   a.) providing a fastener having a centering post at a distal end, a head portion at a proximal end, and a self-tapping portion located between the head portion and the centering post; providing a first link member having a first aperture; and providing a second link member having a slot adapted to receive a portion of said first link member and having a second aperture aligned with a third aperture, with said second and said third apertures located transverse to said slot;
   b.) placing a first end of said first link member into said slot and aligning said first aperture with said second and said third apertures;
   c.) inserting said centering post through said second aperture, through said first aperture, and into said third aperture;
   d.) rotating said fastener to tap said first aperture with said self-tapping portion thereby securing said first link member rotatably to said second member.

2. A method as recited in claim 1 comprising the further steps of providing a vehicle seat track assembly and securing said first link member and said second link member to said vehicle seat track assembly.

3. A method as recited in claim 2 comprising the further steps of:
   e.) providing a fourth aperture in said first link member and providing a cross tube in said vehicle seat track assembly;
   f.) inserting said cross tube through said fourth aperture; and
   g.) engaging said cross tube with said fourth aperture to thereby enable rotation of said fourth aperture to drive a corresponding rotation of said cross tube.

4. A method as recited in claim 3 wherein step g.) further comprises forming said fourth aperture to have a non-circular contour and forming a mating contour on at least a portion of said cross tube, aligning said noncircular contour and said mating contour to thereby engage said cross tube with said fourth aperture.

5. A vehicle linkage assembly for a vehicle seat track assembly comprising:
   a first link member having a first aperture at a first end;
   a second link member having a second aperture, a third apertures and a slot;
   said second aperture aligned with said third aperture and said slot located transversely between said second and said third apertures;
   a fastener having a head portion at a proximal end, a centering post at a distal end, and a self tapping portion located between said head portion and said centering post;
   said first end of said first link member received in said slot and said first aperture aligned with said second and said third apertures;
   said fastener extending through said first aperture, said second aperture, and said third aperture; and
   said self tapping portion tapping said first aperture and rotatably securing said first link member to said second link member.

6. A vehicle linkage assembly as recited in claim 5 wherein said first link member further includes a fourth aperture, said fourth aperture adapted to be connected to a vehicle seat track assembly.

7. A vehicle linkage assembly as recited in claim 6 wherein said fourth aperture includes a non-circular contour, said non-circular contour adapted to engage a cross tube of a vehicle seat track assembly.

8. A vehicle linkage assembly as recited in claim 5 wherein said second link member includes a flared proximal portion, said flared proximal portion including said second and said third apertures.

9. A vehicle linkage assembly as recited in claim 5 wherein said second link member further includes a distal portion and a bolt, said bolt extending through said distal portion and adapted to secure said second link member to a vehicle seat track assembly.

10. A vehicle linkage assembly as recited in claim 5 wherein said first link member is formed from a metal and said second link member is formed from a plastic.

11. A vehicle linkage assembly as recited in claim 5 wherein said head portion of said fastener is adapted to engage a tool;
   rotation of said tool in a first direction when said tool is engaged with said head portion for rotatably securing said first link member to said second link member; and
   rotation of said tool in a second direction opposite said first direction when said tool is engaged with said head portion for disconnecting said first link member from said second link member.

12. A vehicle linkage assembly as recited in claim 11 wherein said head portion of said fastener includes a slot, said slot for engaging said tool.

13. A vehicle seat track assembly comprising:
   a vehicle seat track assembly;
   a first link member having a first aperture at a first end;
   a second link member having a second aperture, a third aperture, and a slot;
   said second aperture aligned with said third aperture and said slot located transversely between said second and said third apertures;
   a fastener having a head portion at a proximal end, a centering post at a distal end, and a self-tapping portion located between said head portion and said centering post;
   said first end of said first link member received in said slot and said first aperture aligned with said second and said third apertures;
   said fastener extending through said first aperture, said second aperture, and said third aperture;
   said self-tapping portion tapping said first aperture and rotatably securing said first link member to said second link member; and
   said first link member and said second link member secured to said vehicle seat track assembly.

14. A vehicle seat track assembly as recited in claim 13 wherein said first link member further includes a fourth aperture and said vehicle seat track assembly includes a cross tube; and
   said fourth aperture engages said cross tube, whereby rotation of said fourth aperture causes a corresponding rotation of said cross tube.

15. A vehicle seat track assembly as recited in claim 14 wherein said fourth aperture includes a non-circular contour;
   said a cross tube includes a mating non-circular contour; and said non-circular contour of said fourth aperture surrounds and engages said mating non-circular contour of said cross tube.

16. A vehicle seat track assembly as recited in claim 13 wherein said second link member includes a flared proximal portion, said flared proximal portion including said second aperture and said third aperture.

17. A vehicle seat track assembly as recited in claim 13 wherein said second link member further includes a distal portion and a bolt, said bolt extending through said distal portion and securing said second link member to said vehicle seat track assembly.

18. A vehicle linkage assembly as recited in claim 13 wherein said first link member is formed from a metal and said second link member is formed from a plastic.

19. A vehicle linkage assembly as recited in claim 13 wherein said head portion of said fastener is adapted to engage a tool;

rotation of said tool in a first direction when said tool is engaged with said head portion for rotatably securing said first link member to said second link member; and rotation of said tool in a second direction opposite said first direction when said tool is engaged with said head portion for disconnecting said first link member from said second link member.

20. A vehicle linkage assembly as recited in claim 19 wherein said head portion of said fastener includes a slot, said slot for engaging said tool.

* * * * *